Jan. 29, 1963 S. UDCOFF 3,075,498
FINGER HOLDER FOR VARIOUS ARTICLES
Filed Oct. 12, 1961 2 Sheets-Sheet 1
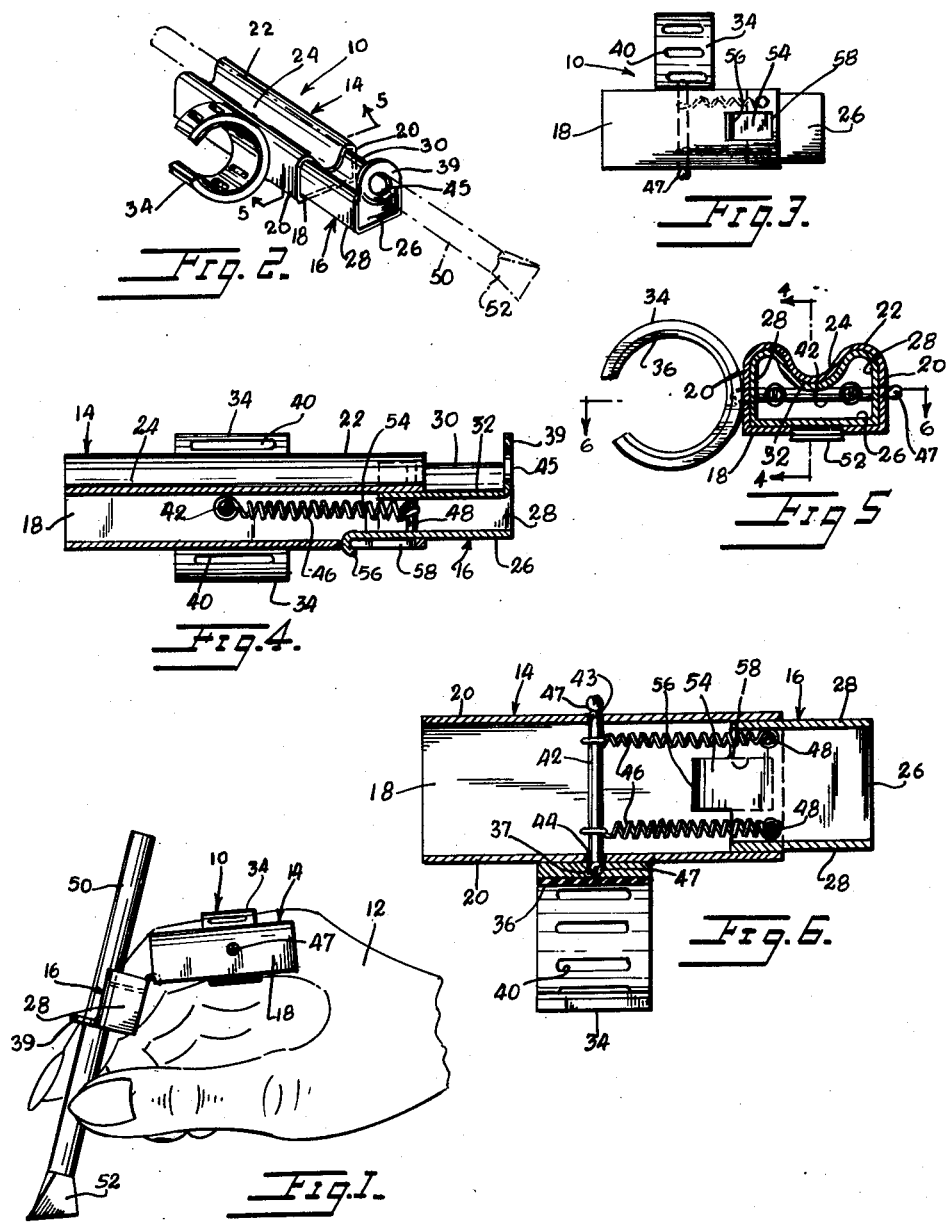
INVENTOR.
STANLEY UDCOFF
BY
ATTORNEY Jan. 29, 1963  S. UDCOFF  3,075,498
FINGER HOLDER FOR VARIOUS ARTICLES
Filed Oct. 12, 1961  2 Sheets-Sheet 2
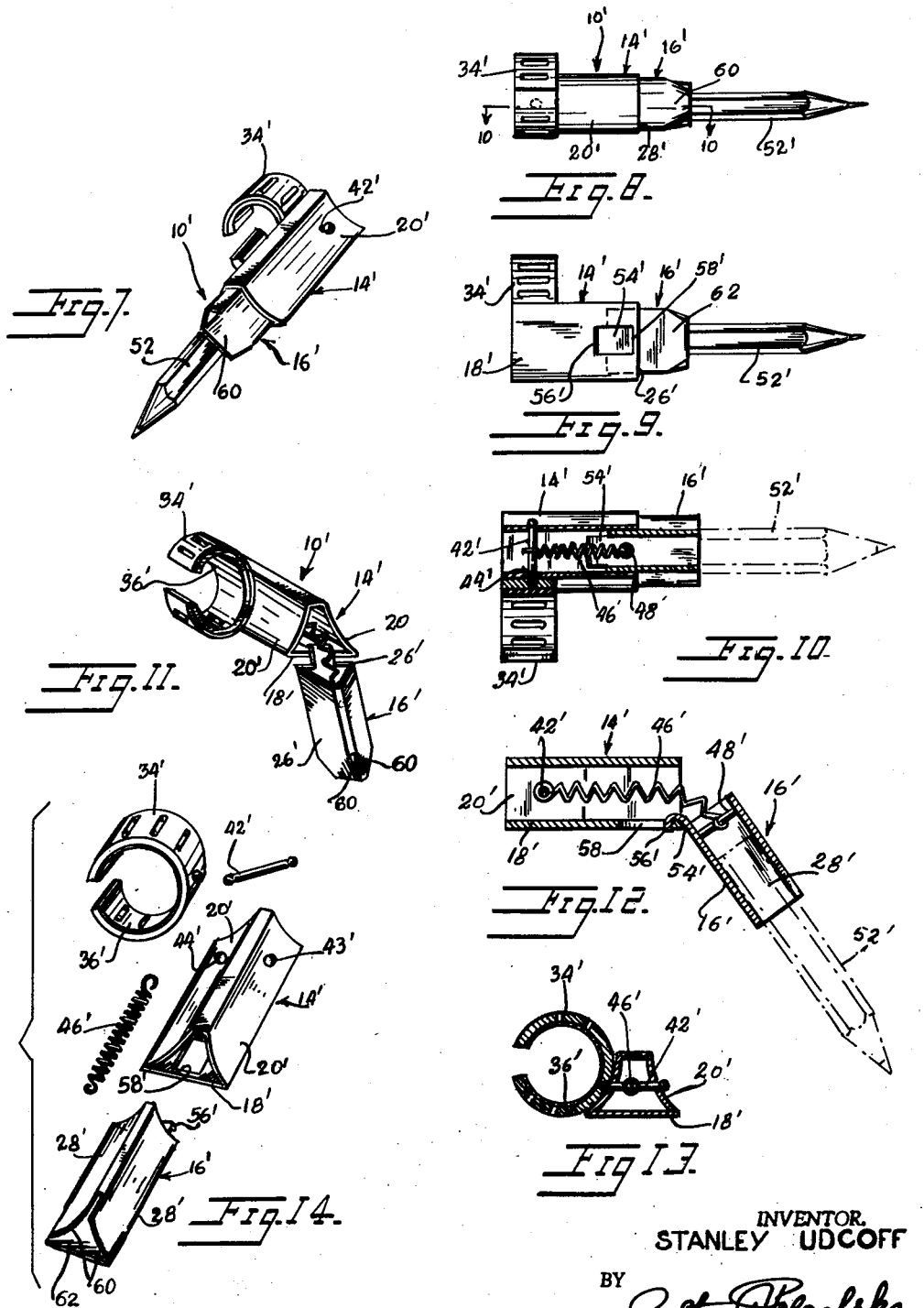
INVENTOR.
STANLEY UDCOFF
BY
ATTORNEY

United States Patent Office 3,075,498
Patented Jan. 29, 1963

3,075,498
FINGER HOLDER FOR VARIOUS ARTICLES
Stanley Udcoff, 243 Wortman Ave., Brooklyn, N.Y.
Filed Oct. 12, 1961, Ser. No. 144,766
9 Claims. (Cl. 120—102)

This invention relates to tool holders and more particularly to a portable tool holder adapted to be mounted on a person's finger.

The invention broadly comprises, according to one form thereof, an elongated two-sectioned body with one section having an elongated groove conforming to the shape of the periphery of the cylindrical handle or body of a tool for supporting the tool in inoperative position. Another section is slidable in the grooved section and carries a bearing for supporting the tool when in operative position. A split ring is secured to the grooved section for detachably mounting the holder on the finger of a person.

According to another form of the invention, the elongated grooved section and the slidable section are triangular in shape in cross section and the slidable section is spring loaded and hingedly mounted.

An important object of the invention is to provide a tool holder that is adapted to be fitted on a person's finger and capable of supporting a tool in either an inoperative position or in an operative position.

Another object of the invention is to provide a sectional tool holder of this type, one section of which is slidable and adjustable to position the tool relative to the work.

A further object of the invention is to provide a sectional tool holder for mounting on a person's finger, one section of which is slidable and hingedly mounted for positioning the tool relative to the work.

Still another object is to provide a sectional tool holder that is adapted to be mounted and carried on the finger of a person, one section being slidable and hingedly mounted and spring loaded to automatic retraction.

Yet another object is to provide a tool holder of this type that is rugged in construction and that can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a tool holder embodying one form of the invention in position on a person's finger and ready for use.

FIG. 2 is a top perspective view of the tool holder partly opened, with a tool shown in dot-dash lines in inoperative position thereon.

FIG. 3 is a bottom plan view of the tool holder of FIG. 2, with the tool omitted.

FIG. 4 is a sectional view taken on the line 4—4 of FIG. 5, on an enlarged scale.

FIG. 5 is a cross-sectional view taken on the line 5—5 of FIG. 2, on an enlarged scale.

FIG. 6 is a sectional view taken on the line 6—6 of FIG. 5.

FIG. 7 is a top perspective view of a tool holder embodying a modified form of the invention, a pencil being shown in supported position thereon.

FIG. 8 is a side elevational view of the tool holder and pencil of FIG. 7.

FIG. 9 is a bottom plan view thereof.

FIG. 10 is a sectional view taken on the line 10—10 of FIG. 8, the pencil being shown in dot-dash lines.

FIG. 11 is a top perspective view of the tool holder of FIG. 7 showing the tool in operative opened condition when on a person's finger.

FIG. 12 is a sectional view through the longitudinal center of the parts of FIG. 11, the split ring being omitted and a pencil shown supported in operative position.

FIG. 13 is an end view looking from the left-hand end of FIG. 8, the pencil being omitted.

FIG. 14 is an exploded perspective view of the tool holder of FIG. 7.

Referring in detail to the drawings, in FIG. 2 a tool holder embodying one form of the invention is shown and designated generally by the reference numeral 10. The tool holder 10 is shown in operative position on the finger of a person's hand 12 in FIG. 1.

The tool holder is formed of sheet metal and has a sectional body formed of an elongated outer tubular member 14 open at both ends and an elongated inner tubular-shaped member 16 open at both ends slidable in the outer member. The outer sectional member 14 has a flat bottom wall 18, flat side walls 20, 20 and a top wall 22 with a depression or groove 24 extending the length thereof. The inner sectional member 16 is similarly shaped with a flat bottom wall 26, side walls 28, 28 and with a top wall 30 having an elongated depression or groove 32 therein. The inner sectional member is dimensioned slightly smaller than the outer sectional member and is shorter with one end telescoped inside the adjacent end of the outer member as best seen in FIGS. 4 and 6, and slidable therein.

A split finger ring 34 is suitably secured to one of the side walls 20 of the outer sectional member 14 midway its ends. The ring is formed of flexible metal with a lining 36 of soft plastic material. The body of the ring and the lining may be formed with spaced aligned slots 40 to enhance the flexibility of the ring.

A pin 42 is carried by the split ring and extends through a hole 44 in the side wall 20 mounting the ring and across the space inside the outer sectional member and has its inner end fitted in a hole 43 in the opposite side wall 20. The pin 42 is longer than the space across the side walls 20 and is formed with a ball head 47 at each end. The head is split to permit it to contract and expand for insertion into and removal from the holes 43 and 44 and socket opening 37 in ring 34.

A pair of coil springs 46, 46, each having one end looped around the pin 42 with the other end looped around one of a pair of pins 48, 48, extending from the bottom wall 26 to the top wall 30 of the inner slidable section 16 as seen in FIG. 4. The spring 46 normally holds the inner section 16 in inner-most horizontal position as shown in FIGS. 2 and 4.

In accordance with the invention, one end of the inner section 16, the outer end as viewed in FIG. 4, is formed with an upright extension 39 formed with a central opening 45 therein. The bottom of the periphery of the opening 45 is aligned with the bottom of the depressions or grooves 24 and 32 in the outer and inner sections 14 and 16, respectively, so that the cylindrical handle 50 of a tool such as a brush 52 may be received therethrough and supported lengthwise in inoperative position as shown in FIG. 2.

The other end of the bottom wall 26 of the inner section 16, the inner end as viewed in FIG. 4, is formed with an extension 54 at its center. The extension terminates in its free end in a curled hook 56 extending through an elongated slot 58 in the bottom wall 18 of the outer section 14. The curled hook 56 serves as a hinge leaf coacting with the adjacent end of the bottom wall 16 of outer section 14 as the other hinge leaf for swinging the inner section 16 around the outer adjacent end of the outer section 14 to properly position a tool in operative position, such as the tool 52 shown in FIG. 1, which is shown positioned substantially in vertical upright position, against the action of springs 46. The fingers of the user maintain the tool in this operative position. When pressure of the fingers of the user is released, the springs 46 retract the inner section 14 with the supported tool to normal inoperative position as shown in FIG. 2, with the handle or body of the tool seated in the grooves in the top walls of the outer and inner sections.

In FIGS. 7 to 14, inclusive, a tool holder 10' embodying a modified form of the invention is illustrated. The tool holder 19' comprises a sectional body with an outer sectional member 14' and an inner slidable sectional member 16'. The outer and inner sectional members are tubular and triangular in cross section. The triangular side walls are slightly curved. The outer sectional member 14' includes a base 18' and two side walls 20', 20' and the inner slidable member 16' includes a base 26' and two side walls 28', 28', one end of the inner member being fitted inside the outer member and being slidable therein. One wall 20' of the outer member is formed with a hole 44' and the base of the outer member is formed with an elongated wide closed slot 58'.

A split ring 34' with flexible fabric lining 36' has one end of a laterally extending pin 42' secured thereto. The pin extends through the hole 44' in the side wall 20' of the outer section and extends across the space in the outer section to the opposite side wall 20' where it is fitted in a hole 43' in the opposite wall 20'.

One end of the inner section 16', the inner end as viewed in FIGS. 7 and 10, is formed with an extension 54' at its center. The extension terminates at its free end in a curled hook 56' extending through the elongated slot 58' in the base 18' of the outer member 14'. The curled hook 56' serves as a hinge leaf coacting with the adjacent end of the bottom wall 18' of the outer section 14' as the other hinge leaf for swinging the inner section 16' around the outer adjacent end of the outer section 14' to properly position a tool in operative position.

The other end of the inner sectional member 16', the outer end as viewed in FIGS. 7 and 12, is slitted along the juncture between the base and side walls thereof, the slits forming flexible clips 60 along the side walls and a flexible clip 62 along the base, said clips adaptable to be bent inwardly to grip and clamp the end of a tool, such as the pencil 52' shown in FIG. 7 therebetween. A coil spring 46' has one end looped around the pin 42' and its other end looped around a pin 48' extending between and secured between the base 26' and the joint between the side walls 28' at the top thereof.

The modified tool holder 10' operates similarly to the tool holder 10, being adapted to be mounted on the finger of the hand of a person. The inner sectional member 16' with supported pencil 52' is swung downwardly to angular operative position such as shown in FIG. 12, and held by the fingers in this position. When pressure of the fingers is released, the single spring 46' retracts the inner member 16' with pencil to horizontal inoperative position as shown in FIGS. 8 and 9.

The invention makes it possible to carry a tool on one's finger ready for instant use, which tool is pivotable and retractable out of the way when not in use.

The ready removal and insertion of the pin 42 or 42' permits the device to be worn on the fingers of the right or the left hand. It is to be understood that the tool holder may be made of metal, plastic or any other suitable material and the holder may be adapted for either right or left hand use.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A tool holder adapted to be mounted on the finger of the hand of a person, said tool holder comprising an elongated tubular body with means for removably mounting the body on the finger of the hand of the user, said body being sectional including an outer tubular section and an inner tubular section slidable in the outer section and swingable on the end of the outer section, said sections having means for supporting a tool in reclined lengthwise inoperative condition and said inner section having means for supporting a tool in angular operative position, the means for supporting a tool in reclined lengthwise inoperative condition being constituted by elongated top walls on the outer and inner sections with central grooves extending the lengths of said top wall, said grooves being in alignment providing a seat for an elongated tool.

2. A tool holder adapted to be mounted on the finger of the hand of a person, said tool holder comprising an elongated tubular body with means for removably mounting the body on the finger of the hand of the user, said body being sectional including an outer tubular section and an inner tubular section slidable in the outer section and swingable on the end of the outer section, said sections having means for supporting a tool in reclined lengthwise inoperative condition and said inner section having means for supporting a tool in angular operative position, the means for supporting a tool in reclined lengthwise inoperative condition being constituted by elongated top walls on the outer and inner sections with central grooves extending the lengths of said top walls, said grooves being in alignment providing a continuous seat for an elongated tool, the means for supporting a tool in angular operative position including an extension on the outer end of the inner section, said extension having a central round opening therein to receive the cylindrical handle or body of a tool.

3. A tool holder adapted to be mounted on the finger of the hand of a person, said tool holder comprising an elongated tubular body with means for removably mounting the body on the finger of the hand of the user, said body being sectional including an outer tubular section and an inner tubular section slidable in the outer section and swingable on the end of the outer section, said sections having means for supporting a tool in reclined lengthwise inoperative condition and said inner section having means for supporting a tool in angular operative position, the means for supporting a tool in reclined lengthwise inoperative condition being constituted by elongated top walls on the outer and inner sections with central grooves extending the lengths of said top walls, said grooves being in alignment providing a continuous seat for an elongated tool, the means for supporting a tool in angular operative position including an extension on the outer end of the inner section, said extension having a central round opening therein to receive the cylindrical handle or body of a tool, and means for retracting the inner section with tool from an angular operative position to inoperative reclined condition.

4. A tool holder adapted to be mounted on the finger of the hand of a person, said tool holder comprising an elongated tubular body with means for removably mounting the body on the finger of the hand of the user, said body being sectional including an outer tubular section and an inner tubular section slidable in the outer section and swingable on the end of the outer section, said sections having means for supporting a tool in reclined lengthwise inoperative condition and said inner section having means for supporting a tool in angular operative position, the means for supporting a tool in reclined lengthwise inoperative condition being constituted by elongated top walls on the outer and inner sections with central grooves extending the lengths of said top walls, said grooves being in alignment providing a continuous seat for an elongated tool, the means for supporting a tool in angular operative position including an extension on the outer end of the inner section, said extension having a central round opening therein to receive the cylindrical handle or body of a tool, and means for retracting the inner section with tool from an angular operative position to inoperative reclined condition, said retracting means including coiled springs having one end secured to the outer section and the other end secured to the inner section adjacent the inner end of the inner section.

5. A tool holder adapted to be mounted on the finger of the hand of a person, said tool holder comprising an elongated tubular body with means for removably mounting the body on the finger of the hand of the user, said body being sectional including an outer tubular section and an inner tubular section slidable in the outer section and swingable on the end of the outer section, said sections having means for supporting a tool in reclined lengthwise inoperative condition and said inner section having means for supporting a tool in angular operative position, the means for supporting a tool in reclined lengthwise inoperative condition being constituted by elongated top walls on the outer and inner sections with central grooves extending the lengths of said top walls, said grooves being in alignment providing a continuous seat for an elongated tool, the means for supporting a tool in angular operative position including an extension on the outer end of the inner section, said extension having a central round opening therein to receive the cylindrical handle or body of a tool, means for retracting the inner section with tool from an angular operative position to inoperative reclined condition, said retracting means including coiled springs having one end secured to the outer section and the other end secured to the inner section adjacent the inner end of the inner section, and means for limiting the retracting movement of the inner section with tool.

6. A tool holder adapted to be mounted on the finger of the hand of a person, said tool holder comprising an elongated tubular body with means for removably mounting the body on the finger of the hand of the user, said body being sectional including an outer tubular section and an inner tubular section slidable in the outer section and swingable on the end of the outer section, said sections having means for supporting a tool in reclined lengthwise inoperative condition and said inner section having means for supporting a tool in angular operative position, the means for supporting a tool in reclined lengthwise inoperative condition being constituted by elongated top walls on the outer and inner sections with central grooves extending the lengths of said top walls, said grooves being in alignment providing a continuous seat for an elongated tool, the means for supporting a tool in angular operative position including an extension on the outer end of the inner section, said extension having a central round opening therein to receive the cylindrical handle or body of a tool, means for retracting the inner section with tool from an angular operative position to inoperative reclined condition, said retracting means including coiled springs having one end secured to the outer section and the other end secured to the inner section adjacent the inner end of the inner section, and means for limiting the retracting movement of the inner section with tool, said limiting means including an elongated slot in the outer section, an extension on the inner end of the inner section and a curled hook on the inner free end of the extension adapted to abut against the inner edge wall of the slot in the outer section.

7. A tool holder adapted to be mounted on the finger of the hand of a person, said tool holder comprising an elongated tubular body, said body being sectional including an outer tubular sectional member and an inner tubular sectional member, slidable in the outer sectional member and swingable on the end of the outer sectional member, a flexible split finger ring on the outer sectional member midway its ends for detachably mounting the body on a finger of the hand of a person, said outer and inner sectional members each having a flat bottom wall, flat side walls, a top wall having a central groove extending the length thereof, the inner section being slidable in the outer section and normally extending outwardly of one end of the outer section, said outer sectional member having an opening midway its ends, a pin carried by the finger ring and extending through the opening in the outer sectional member and across the interior space in the outer section, coiled springs having one end secured to the pin and having the other ends thereof secured to a fixed portion of the slidable inner section, an upward extension on the outer end of the top wall of the slidable inner section, said extension having a central round opening, the bottom of the round opening being aligned with the bottom of the aligned grooves in the top walls of the outer and inner sections for receiving and seating an elongated tool with cylindrical handle or body, the bottom wall of said outer section having an elongated closed slot therein, an extension on the inner end of the inner section, a curled hook on the free end of said extension protruding through the slot in the outer section, said hook adapted to swing around the outer edge of the slot in the outer section whereby the inner section is adapted to be swung to angular position and carry a tool received in the opening in the extension thereof to angular operative position.

8. A tool holder adapted to be mounted on the finger of the hand of a person, said tool holder comprising an elongated tubular body, said body being sectional including an outer tubular sectional member and an inner tubular sectional member, slidable in the outer sectional member and swingable on the end of the outer sectional member, a flexible split finger ring on the outer sectional member midway its ends for detachably mounting the body on a finger of the hand of a person, said outer and inner sectional members being triangular in cross section, each sectional member having a base and each having one flat slanting side wall and one curved slanting side wall, means on one end of the inner section serving as a socket for clamping one end of a tool thereto, the curved slanting wall of the outer sectional member mounting the split ring and having a hole midway its ends, the base of said outer sectional member having an elongated closed slot, a pin carried by said split ring extending through the hole in the side wall of the outer sectional member and across the interior of said outer sectional member, a pin extending across the space in the inner sectional member adjacent its inner end, a coil spring having one end secured to the pin extending across the outer sectional member and its other end secured to the pin extending across the inner sectional member whereby the sections are urged to nested telescopic relation, said inner sectional member having an extension on the inner end of its base, a curled hook on the inner end of said extension, and extending through the slot in the base of the outer sectional member, said hook serving as a hinge leaf with the edge wall of said slot serving as the other hinge leaf whereby the inner sectional member is adapted to be swung around the outer edge of the outer sectional member to carry a tool to angular operative position, said curled hook serving as an abutment to limit retracting movement of the inner sectional member with tool.

9. A tool holder adapted to be mounted on the finger of the hand of a person, said tool holder comprising an elongated tubular body, said body being sectional including an outer tubular sectional member and an inner tubular sectional member, slidable in the outer sectional member and swingable on the end of the outer sectional member, a flexible split finger ring on the outer sectional member midway its ends for detachably mounting the body on a finger of the hand of a person, said outer and inner sectional members being triangular in cross section, each sectional member having a base and each having one flat slanting side wall and one curved slanting side wall, means on one end of the inner section serving as a socket for clamping one end of a tool thereto, the curved slanting wall of the outer sectional member mounting the split ring and having a hole midway its ends, the base of said outer sectional member having an elongated closed slot, a pin carried by said split ring extending through the hole in the side wall of the outer sectional member and across the interior of said outer sectional member, a pin extending across the space in the inner sectional member adjacent its inner end, a coil spring having one end secured to the pin extending across the outer sectional member and its other end secured to the pin extending across the inner sectional member whereby the sections are urged to nested telescopic relation, said inner sectional member having an extension on the inner end of its base, a curled hook on the inner end of said extension, and extending through the slot in the base of the outer sectional member, said hook serving as a hinge leaf with the edge wall of said slot serving as the other hinge leaf whereby the inner sectional member is adapted to be swung around the outer edge of the outer sectional member to carry a tool to angular operative position, said curled hook serving as an abutment to limit retracting movement of the inner sectional member with tool, the socket means on the end of the inner sectional member including slits in the junctures between the base and side walls of the inner sectional member and between the junctures of the side walls at the tops thereof, said slits forming clips adapted to be pressed inwardly to clamp the end of the cylindrical handle or body of a tool therebetween.

References Cited in the file of this patent

UNITED STATES PATENTS

| | | |
|---|---|---|
| 264,593 | Wright | Sept. 19, 1882 |
| 1,094,888 | Ehrle | Apr. 28, 1914 |
| 1,434,590 | Chafetz | Nov. 7, 1922 |
| 1,577,272 | Treadaway | Mar. 16, 1926 |
| 1,655,330 | Niznansky | Jan. 3, 1928 |
| 2,501,552 | Thompson | Mar. 21, 1950 |
| 3,005,441 | Glasscock | Oct. 24, 1961 |